United States Patent
Ovenden (10) Patent No.: US 7,577,736 B1
(45) Date of Patent: Aug. 18, 2009

(54) NETWORK ACCOUNTING STATISTICS COLLECTION

(75) Inventor: Francis Ovenden, Groton, MA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1503 days.

(21) Appl. No.: 10/686,071

(22) Filed: Oct. 15, 2003

(51) Int. Cl.
G06F 15/173 (2006.01)
H04L 12/26 (2006.01)

(52) U.S. Cl. ................ 709/224; 709/234; 709/238; 370/229

(58) Field of Classification Search .............. 709/224, 709/234, 238; 370/229
See application file for complete search history.

(56) References Cited

U.S. PATENT DOCUMENTS

| | | | | |
|---|---|---|---|---|
| 6,847,613 B2 * | 1/2005 | Mimura et al. | .............. | 370/235 |
| 6,894,972 B1 * | 5/2005 | Phaal | .............. | 370/229 |
| 7,376,085 B2 * | 5/2008 | Yazaki et al. | .............. | 370/235 |
| 7,478,156 B1 * | 1/2009 | Pereira | .............. | 709/224 |
| 2002/0105911 A1 * | 8/2002 | Pruthi et al. | .............. | 370/241 |
| 2003/0179705 A1 * | 9/2003 | Kojima | .............. | 370/230 |

* cited by examiner

Primary Examiner—Jungwon Chang
(74) Attorney, Agent, or Firm—David A. Dagg (57) ABSTRACT

A system for network accounting statistics collection including a statistics collector associated with each packet forwarding engine. Each statistics collector has one or more accounting elements, each of which includes some number of counters, such as packet and byte counters. Each statistics collector receives accounting instructions from the associated forwarding engine for packets processed by the forwarding engine, including packets that will be discarded without being forwarded. Each accounting instruction includes an identifier uniquely indicating one of the accounting elements, and information used to increment the counters within the accounting element. Upon receipt of an accounting instruction, the receiving statistics collector increments the counters in the accounting element. The accounting instruction is a relatively simple primitive operation in the disclosed system, enabling high-speed operation. Each statistics collector collects data over a fixed sampling interval that may range from a number of milliseconds to one or more minutes. Each sampling period begins with a reset of an accounting element store, and ends with at least one set of data being flushed to a management system for further processing and/or formatting.

19 Claims, 4 Drawing Sheets

NETWORK ACCOUNTING STATISTICS COLLECTION

FIELD OF THE INVENTION

The present invention relates generally to measuring and monitoring communication network activity, and more specifically to a deterministic and scalable system and method for accurately collecting and processing network accounting statistics.

BACKGROUND OF THE INVENTION

As the Internet has become a commercial service and grown in capacity, the requirements for measuring, monitoring and accounting for IP (Internet Protocol) packet traffic have increased. These requirements can be met using statistics reflecting packets flowing through various networking devices, such as switches, routers, and others. For statistical purposes, network traffic monitored at such devices may be associated with particular users on logical or physical interfaces to the network, and/or specific aggregated traffic trunks. The statistics gathered should reflect both in-bound and out-bound traffic, and be collected at each specific network interface of the networking devices.

Existing systems are available that calculate traffic volume at interfaces, without providing absolute accuracy. When network traffic statistics are used for sensitive applications such as customer billing, however, it is important that every packet is accounted for accurately. Moreover, there are many uses for network traffic statistics that require specific sets of packets to be isolated and counted separately. For example, this is the case in a customer billing application when distinct sets of packets are handled differently to provide different levels of service quality. Similarly, some applications may need to independently and accurately monitor specific packets that violate security policies.

Systems currently exist for detecting detailed information regarding traffic flows within streams of multiple flows at one or more network interfaces. The collected information is used to subsequently create many types of summary records describing traffic statistics. However, existing solutions have significant shortcomings with today's high speed interfaces, due to the fact that even a single traffic stream often includes a large number of flows, each consisting of many packets. As a result, individual devices quickly produce high volumes of statistics to be communicated between system components. Moreover, the raw statistics collected by such existing systems may be sent from multiple devices to a remote system for processing of the aggregated data into one or more application specific formats. Such high volume central aggregation, though potentially flexible, can consume significant communication bandwidth within the network, and requires processing resources in the remote aggregating system, as well as in each statistics gathering device. Alternatively, raw statistics may be processed at a collecting device into a form closer to the needs of a target application, in order to reduce the volume of data transferred to a central processing point. However, requirements that packet devices pre-process large amounts of raw statistics may increase system processing requirements which may greatly increase the cost and system power requirements.

Lack of accuracy is another problem to be avoided in statistics gathering and processing. Packet forwarding devices having high speed interfaces use fast, powerful processors and/or dedicated hardware to forward common types of packets. Packet types requiring more complex processing may be passed to a separate subsystem running an exceptions handling process. In existing systems, packets destined for such exception processing subsystems may bypass the statistics collecting mechanism. Moreover, accurate statistics collection may require creation of specific statistics data that can be used to adjust general statistics records to improve overall accuracy. For example, in some cases, it may be desirable to subdivide flows for statistical purposes based on conformance to a traffic policing policy or rate contract. To maintain useful statistics, information regarding conformance of specific packets relative to other packets within a shared flow needs to be accessible. This information could then be relayed to the statistics processing system.

One possible approach to improving efficiency is to employ data reduction algorithms that rely on historically observed statistical traffic patterns. However, since traffic patterns often change over time, these types of statistical techniques may give rise to non-deterministic behaviors.

Accordingly, it would be desirable to have a new system for generating meaningful statistics on network traffic that is fully deterministic, and that avoids inaccuracy and poor scalability problems. The system should be convenient for use with common Internet protocols, including IP, MPLS (MultiProtocol Label Switching), and Ethernet. The system should not adversely impact forwarding operation performance in traffic monitoring systems, and should accurately gather network traffic information reflecting all packets regardless of type, without ignoring packets in the face of high traffic levels.

SUMMARY OF THE INVENTION

A system for network accounting statistics collection is disclosed, including a statistics collector associated with each packet forwarding engine. The statistics collector may be centralized or distributed on interface line cards, depending on the forwarding architecture of the forwarding device platform. Each of the disclosed statistics collectors has one or more accounting elements. In a preferred embodiment, each of the accounting elements includes two counters (64-bit counters, for example, may be needed for high speed interfaces), one to count packets and one to count bytes. Each statistics collector receives accounting instructions from the associated forwarding engine for packets processed by the forwarding engine, including packets that will be discarded without being forwarded. Each accounting instruction includes an identifier uniquely indicating an associated one of the accounting elements, and other information regarding the associated packet, such as an integer value representing the size of the packet in bytes. Upon receipt of an accounting instruction, the receiving statistics collector adjusts any relevant counters within the identified accounting element, for example incrementing a packet counter by one and adding the packet size to a byte counter. The accounting instruction is a relatively simple primitive operation, thus enabling high-speed operation. Each statistics collector collects data over a fixed sampling interval that may range from a number of milliseconds to one or more minutes. Each sampling interval begins with a reset of at least a portion of the accounting element store, and ends with at least one set of data being flushed to a management system for further processing and/or formatting. In a preferred embodiment, a flush process runs for a previous accounting sample in parallel with a current sampling period, thus utilizing a double buffer storing two sampling periods worth of accounting element data.

The maximum number of accounting elements supported by the disclosed system depends, at least in part, on the rate at which a sample set of accounting elements can be flushed, which must be sufficient to allow for an entire sample to be flushed within a single sampling interval.

Convenient application interpretation of statistical data from the accounting elements is supported by application level definitions of the data each accounting element represents. Such definitions may be obtained, for example, through participation by the application or by a network administrator in a configuration process, causing the forwarding engine, accounting elements, and post collection process to share such definitions.

Classification capabilities of the associated forwarding engine determine the granularity of packet flows for which statistics can be collected by any given accounting element. Accuracy of the statistical data also depends on the associated forwarding engine ensuring that all relevant processed packets are indicated to the statistics collector. A signaling interface from the forwarding engine to the statistics collector passes the accounting instructions for each packet.

Instead of attempting to meet the broadest set of accounting needs through collection of large volumes of data, the disclosed system supports a broad range of relevant applications by providing specific statistics data on an "as required" basis, thus conveniently providing high levels of data reduction. The disclosed system enables a user to identify a priori the specific statistics to be collected, so that the statistics collector can closely match the needs of the application. Accordingly, the required data processing is substantially less in most situations, and there is a reduction in transmission bandwidth consumed both inside the device and to external locations.

While one objective of the disclosed system is to support highly granular accounting, all statistical data need not be gathered at the same level of detail. This aspect of the disclosed system avoids the potential for data explosion. Multiple accounting granularities may be supported simultaneously, depending on the number of accounting elements. The disclosed system enables collection of highly detailed accounting statistics, depending on the availability of accounting element resources. Accordingly, applications or services requiring more accounting elements carry additional cost. For example, a user that wants to receive audit information containing a detailed breakdown of many flow types may warrant a price premium for such service.

Thus there is disclosed a fully deterministic system for generating network traffic statistics that avoids problems of inaccuracy and poor scalability. The disclosed system works equally well for Multi-Protocol Label Switching and Internet Protocol version 4 and 6 packets, as well as other types of packet traffic, such as Ethernet frames. The disclosed system need not adversely impact forwarding operation performance in traffic monitoring systems, and accurately gathers network traffic information reflecting all packets regardless of their type, even in the face of high traffic levels.

BRIEF DESCRIPTION OF THE DRAWINGS

The invention will be more fully understood by reference to the following detailed description of the invention in conjunction with the drawings, of which.

DETAILED DESCRIPTION OF THE PREFERRED EMBODIMENTS

Figure 1:
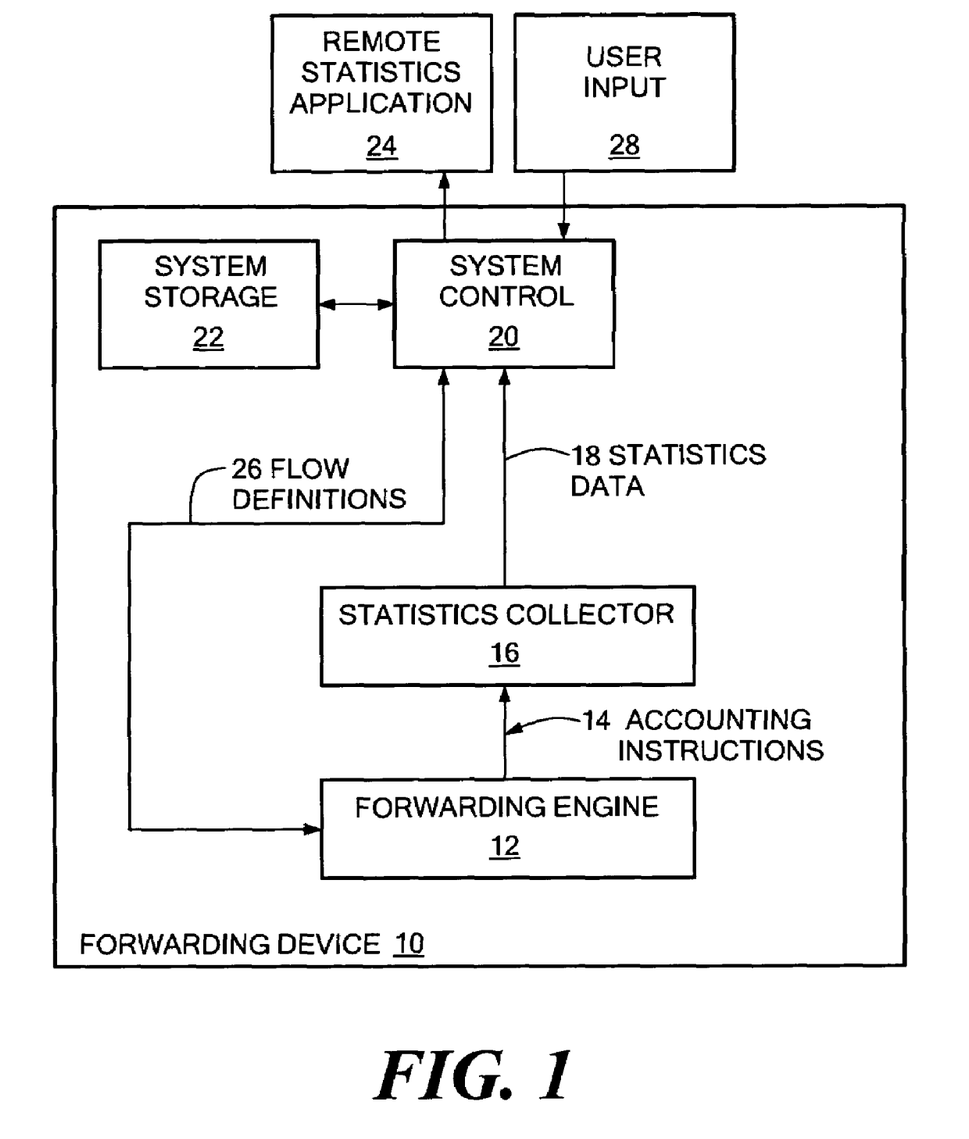
FIG. 1 is a block diagram showing the structure of an illustrative embodiment of the disclosed system.

As shown in FIG. 1, an illustrative embodiment of the disclosed system includes a forwarding device 10, such as a routing and/or switching packet forwarding device, communicably coupled with a remote statistics application 24. The forwarding device 10 is operable to receive user input 28 to a system control function 20. The system control function 20 is coupled to system storage 22. During operation of the embodiment shown in FIG. 1, flow definitions 26 are passed from system control 20 to the forwarding engine 12. Each of the flows described by the flow definitions 26 is a set of packets, potentially within a larger packet stream passing through one or more network interfaces of the forwarding device 10, that conform to a common definition. Examples of flows include all TCP packets, all packets destined to a common network, and/or all packets marked for premium service quality treatment passing through a given interface to the forwarding device 10. The flow definitions 26 may, for example, reflect flow information passed to the system control function 20 in the user input 28, thus allowing a system manager to configure the disclosed system to collect only those statistics that are meaningful to the application or applications that use them.

The flow definitions 26 define the set of packet statistics to be reported by the forwarding engine 12 to the statistics collector 16. Statistics are passed by the forwarding engine 12 to the statistics collector 16 in the form of accounting instructions 14. The statistics collector 16 periodically passes statistics data 18 to the system control function 20, which assembles the statistics data 18 into some convenient data record format and stores it into the system storage 22. The formatted statistics data 18 is then made available to, or sent to, the remote statistics application 24. The statistics data 18 may, for example, be formatted using the system control function 20 within the forwarding device 10 into one or more statistics records for presentation to the remote statistics application 24. Such statistics records may be in a human readable format, such as text, or in a non-human readable, binary format. The remote statistics application 24 then performs further processing as needed.

The system control function 20, statistics collector 16, and forwarding engine 12 may be implemented using various combinations of dedicated hardware, software, and/or firmware components. Accordingly, one or more processors within the forwarding device 10 may be used to execute any such software or firmware components. For example, processing and program code storage resources may be embodied within, and/or associated with, the system control function 20, forwarding engine 12 and statistics collector 16 in the forwarding device 10. Similarly, the remote statistics application 24 may also be embodied using software executing on processing resources located in a remote execution platform.

Figure 2:
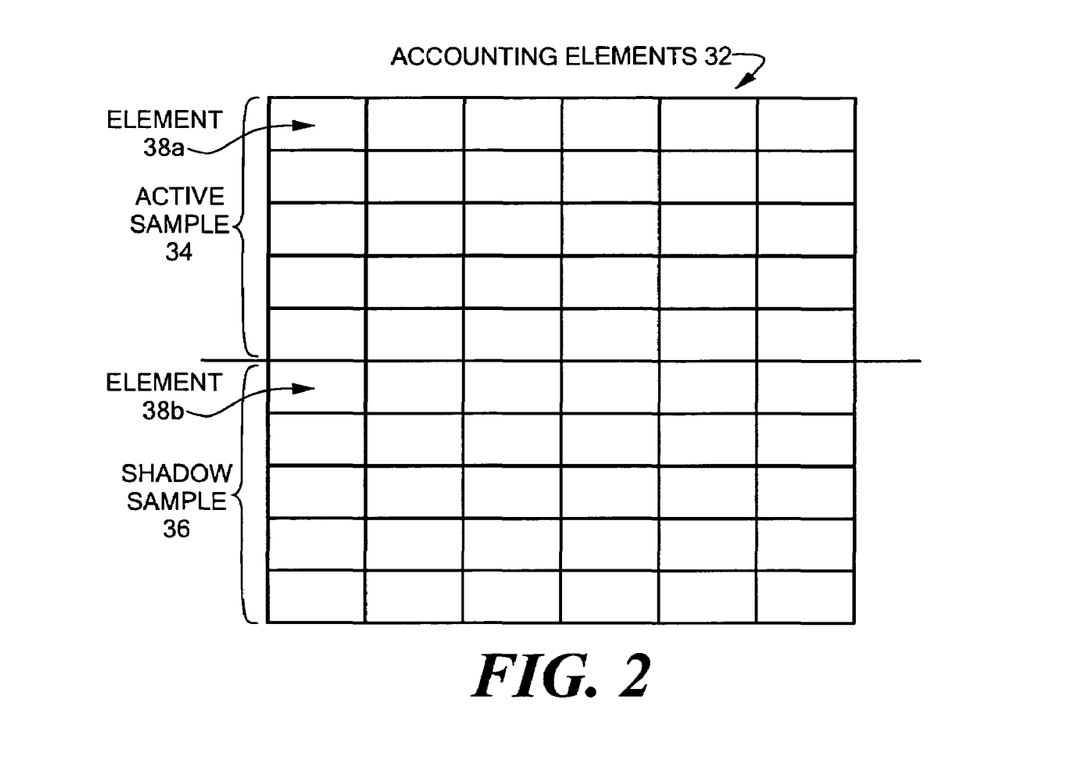
FIG. 2 is a block diagram showing an illustrative embodiment of accounting elements within a statistics collector.

FIG. 2 shows an illustrative embodiment of accounting elements 32 stored within the statistics collector 16 of FIG. 1. As shown in FIG. 2, the accounting elements 32 include an active sample 34, as well as a shadow sample 36. Each of the accounting elements 32 is one or more storage locations uniquely identified by a corresponding accounting element identifier. Each of the accounting elements 32 stores information regarding a corresponding one of the monitored flows described by the flow definitions 26 of FIG. 1. For example, an accounting element may maintain counters for packet and byte counts for the corresponding flow.

The active sample 34 is used to collect statistics during a current sampling interval, while the shadow sample 36 contains statistics collected during a previous sampling interval. For example, element 38a in the active sample 34 is collecting statistics regarding a specific flow during the current sampling interval, while the statistics for that flow in a previous sampling interval are stored in element 38b. At the end of each sampling interval, the samples within the accounting elements 32 are flipped, such that the active sample 34 becomes the new shadow sample. In addition, the shadow sample 36 is cleared, and becomes the new active sample. The disclosed system then begins passing the new shadow sample as statistics data 18 to the system control 20. Sufficient time must be allowed within a sampling interval for the entire contents of the current shadow sample to be transferred to the system control 20. The time duration of the sampling interval may be user configurable, for example down to a time period of five minutes per sample. The sampling interval for statistics collection in the disclosed system may be shorter than a longer time interval over which the remote statistics application 24 operates to form accounting records by combining multiple accounting element samples.

Figure 3:
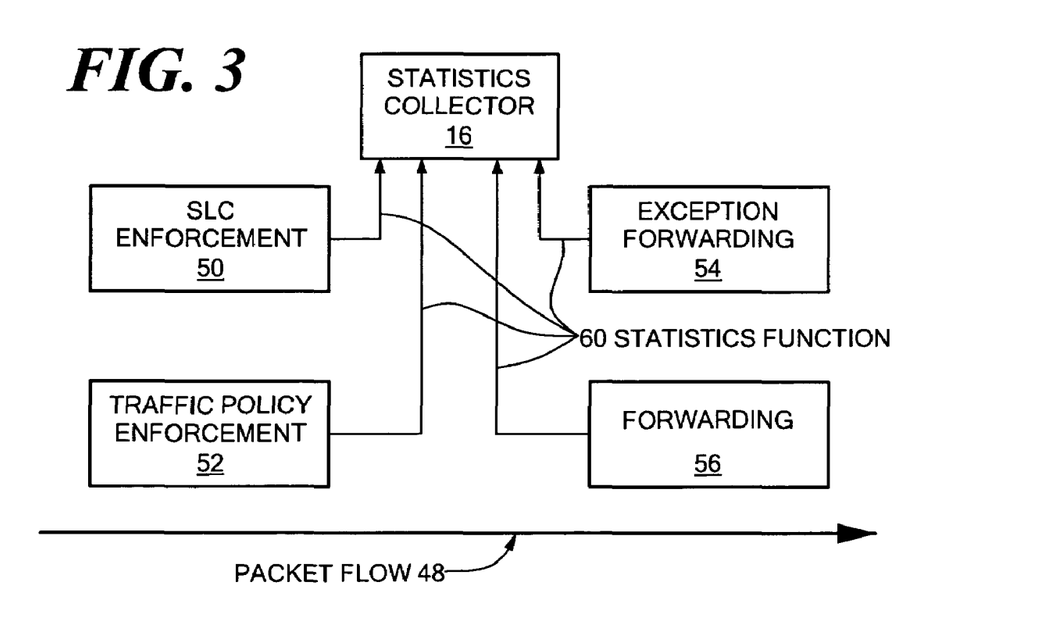
FIG. 3 is a block diagram showing the structure of an illustrative embodiment of a forwarding engine.

FIG. 3 is a block diagram showing the structure of an illustrative embodiment of the forwarding engine 12 of FIG. 1. As shown in FIG. 3, the forwarding engine 12 includes an SLC (Service Level Contract) enforcement component 50, a traffic policy enforcement component 52, an exception forwarding component 54, and a forwarding component 56. The SLC enforcement component 50 operates to enforce one or more SLCs applicable to the forwarding device. As it is generally known, an SLC may reflect a service level agreement (SLA), which may include a rate contract defining how much traffic can be sent over an interface to a service provider's network. The rate contract may include a committed information rate defining how many packets per second the service promises will be accepted from the interface. A burst information rate may also be defined allowing higher traffic rates for short periods. Packets falling within the burst information rate may have a relatively higher probability of loss. Any packet beyond these defined rates may simply be dropped or sent with a very high probability of loss, on a "best-effort" basis. A separate rate contract may be defined for each level of service if more than one level is provided. SLAs may define the QoS (Quality of Service) for certain packets. QoS may indicate aspects of the service associated packets will receive in the service provider's network, regarding transmission time, variations in transmission time (jitter), the probability of packet loss, and available bandwidth (throughput).

As each packet is processed by the forwarding engine 12, the SLC enforcement component 50 operates to enforce any relevant SLCs, such that packets are classified according to which service level they fall within, and marked according to such service levels as needed. Additionally, the SLC enforcement component 50 may allocate resources to packets to enforce such SLCs, for example, by sending packets to appropriate queues within the forwarding engine, and/or scheduling packets for forwarding, in response to the service level associated with the packets. Any service classification performed by the SLC enforcement component 50 may be reflected in the packet statistics collected by the disclosed system. This enables statistical collection down to the service class within a given flow, thus reflecting dynamic system performance and behavior. Moreover, any packets that are dropped or discarded as a result of operations by the SLC enforcement component 50 may be accounted for, and potentially identified as dropped packets within the statistical data. In this way, a rate policing mechanism may be used to determine the conformance of each packet to a rate contract, and provide detailed packet statistics describing enforcement of that rate contract within the disclosed system.

The traffic policy enforcement component 52 operates to enforce traffic policies outside of SLC enforcement, for example, resulting from policies within a network service provider. In this regard, the traffic policy enforcement component 52 may perform multi-field packet rule matching and security related packet filtering for the forwarding engine 12. In the event one of the flow definitions 26 specifies a flow including packets handled by the traffic policy enforcement component 52, calls to the statistics function 60 are performed by the traffic policy enforcement component 52 when such packets are detected. In this way, statistics can be collected on packets processed by the forwarding engine based on matching one or more traffic policy enforcement rules within the forwarding engine, and/or detection of packets subject to one or more security filters. In the event a packet is discarded by the forwarding engine in response to operations performed by the traffic policy enforcement component 52, that packet can cause an accounting instruction to be sent to the statistics function 60 by the traffic policy enforcement module 52.

The exception forwarding component 54 operates to process packets requiring special actions not performed in the high speed forwarding path of the forwarding device. Such packets might be any type of packet not processed within the standard forwarding logic of the forwarding component 56 of the forwarding device. Packets processed by the exception forwarding component 54 may, for example, include non-data packets, such as network management packets, out of band signaling packets, and data packets requiring special services such as fragmentation or some other uncommon and process intensive operations. Packets processed by the exception forwarding component 54 may be subject to statistics collection, just as any other packet processed by the forwarding device, since the exception forwarding component 54 has access to the statistics function 60 to generate accounting instructions to the statistics collector 16.

The forwarding components 54 and 56 provide the forwarding table look-ups used to forward packets processed by the forwarding device. The results of these table look-ups may also be used as triggers for calls to the statistics function 60, further enabling detailed statistics collection.

As described above, each of the components 50, 52, 54 and 56 are operable to invoke the statistics function 60 that sends an accounting instruction to the statistics collector 16. Accordingly, whenever one of the components 50, 52, 54 and 56 detects a packet matching one of the flows described by the flow definitions 26, that component, directly or indirectly, invokes the statistics function 60 to send an accounting instruction describing certain attributes of the packet to the statistics collector 16. The accounting instruction also identifies the accounting element within the statistics collector 16 in which information about the detected packet is to be stored.

Figure 4:
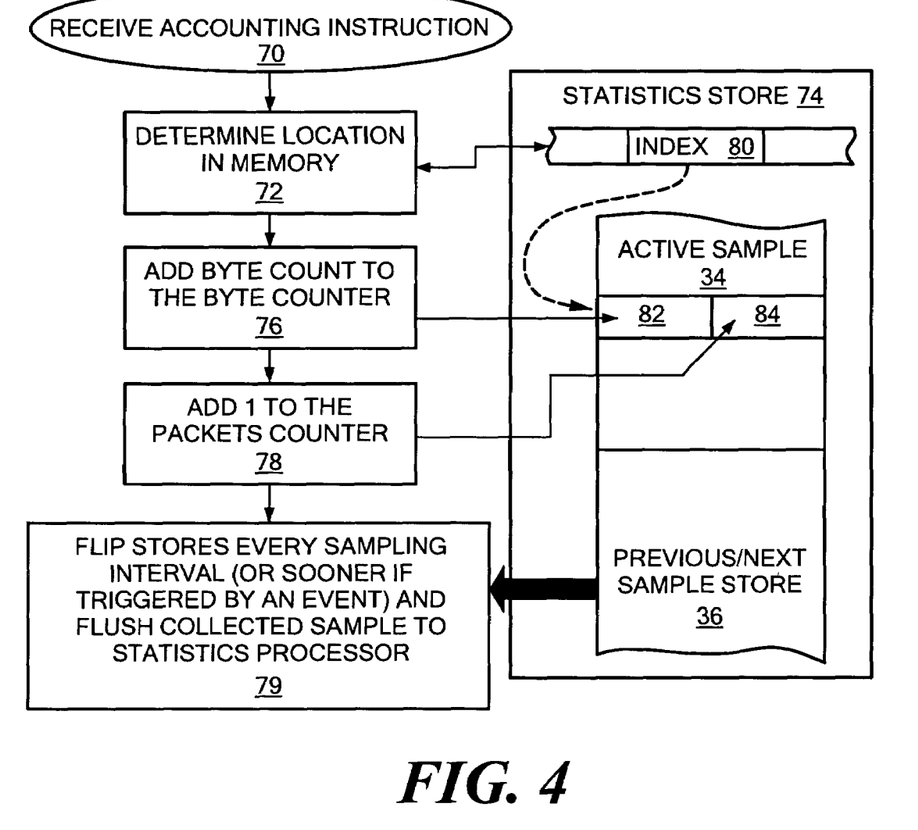
FIG. 4 is a block diagram illustrating statistics collection operation of an embodiment of the disclosed system.

FIG. 4 is a block diagram illustrating operation of an embodiment of the statistics collector 16 shown in FIG. 1. The statistics collector receives an accounting instruction as input 70 from the forwarding engine 12. At step 72, the statistics collector 16 determines a location of the accounting element associated with the accounting instruction, for example using an element identifier such as the index 80 shown stored within an accounting instruction within the statistics store 74. The index 80 indicates the location of an accounting element within the active store 34, shown for purposes of illustration including a byte counter 82 and a packets counter 84. At step 76, the statistics collector 16 adds a byte count from the accounting instruction to the byte count 80, and at step 78 the statistics collector 16 increments the packet counter 84. A shadow sample, shown for example as the previous/next sample store 36, is "flipped" at step 79 at the end of each sampling interval, such that the active sample becomes the shadow sample, and vice versa. The active and shadow samples may be flipped in response to a detected event as well. While statistics are being gathered in the current active sample, the statistics in the shadow sample are being "flushed" to the statistics processor, for example by transfer to the system storage 22 as shown in FIG. 1, from which they can be accessed by or sent to a remote application such as the statistics application 24 of FIG. 1.

Figure 5:
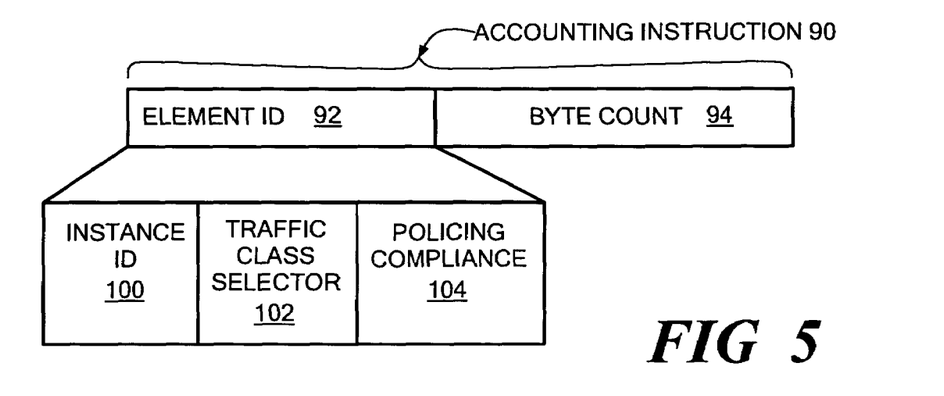
FIG. 5 is a block diagram showing an illustrative format of an accounting instruction.

FIG. 5 is a block diagram showing an illustrative format of an accounting instruction 90. The accounting instruction 90 is shown including an element ID 92 and a byte count 94. The element ID 92 includes information uniquely defining a flow for which statistics are collected within the system. In one embodiment, system wide accounting manager software allocates element IDs for each flow being monitored. A user may request definition of multiple monitored flows having corresponding element IDs. The system accounting manager function then configures the necessary flow identification mechanisms in the data path, for example within the forwarding engine of the device. When these flow identification mechanisms match a packet within the forwarding engine, a call is made to the accounting statistics function, providing the element ID of the flow. When statistics are flushed to a statistics application, the collected statistics and flow identification are associated, for example, by location of the accounting element within the sample, in order to construct the final application accounting records.

In the illustrative embodiment of FIG. 5, within the element ID 92 there is shown an instance ID 100 uniquely identifying the accounting element for a flow instance from the flow definitions 26 in FIG. 1. For example, the instance ID 100 may be large enough to uniquely identify at least a million flows, and is accordingly at least 20 bits wide. The traffic class selector 102 identifies the class of the packet associated with the accounting instruction 90 within the flow, and this field should be sufficiently wide to identify at least 16 classes (4 bits). The policing compliance field 104 identifies the policing compliance of the associated packet, for example within four compliance levels (2 bits), including, for example, such packet categories as 1) within CIR (Committed Information Rate), 2) above CIR but less than BIR (Burst Information Rate), and 3) above BIR.

The accounting instruction format of FIG. 5 is given for purposes of illustration and explanation only, and the present system is not limited to such a format. The accounting instruction of the disclosed system may be configured to convey any appropriate information regarding a detected packet to be stored in the associated accounting element.

Figure 6:
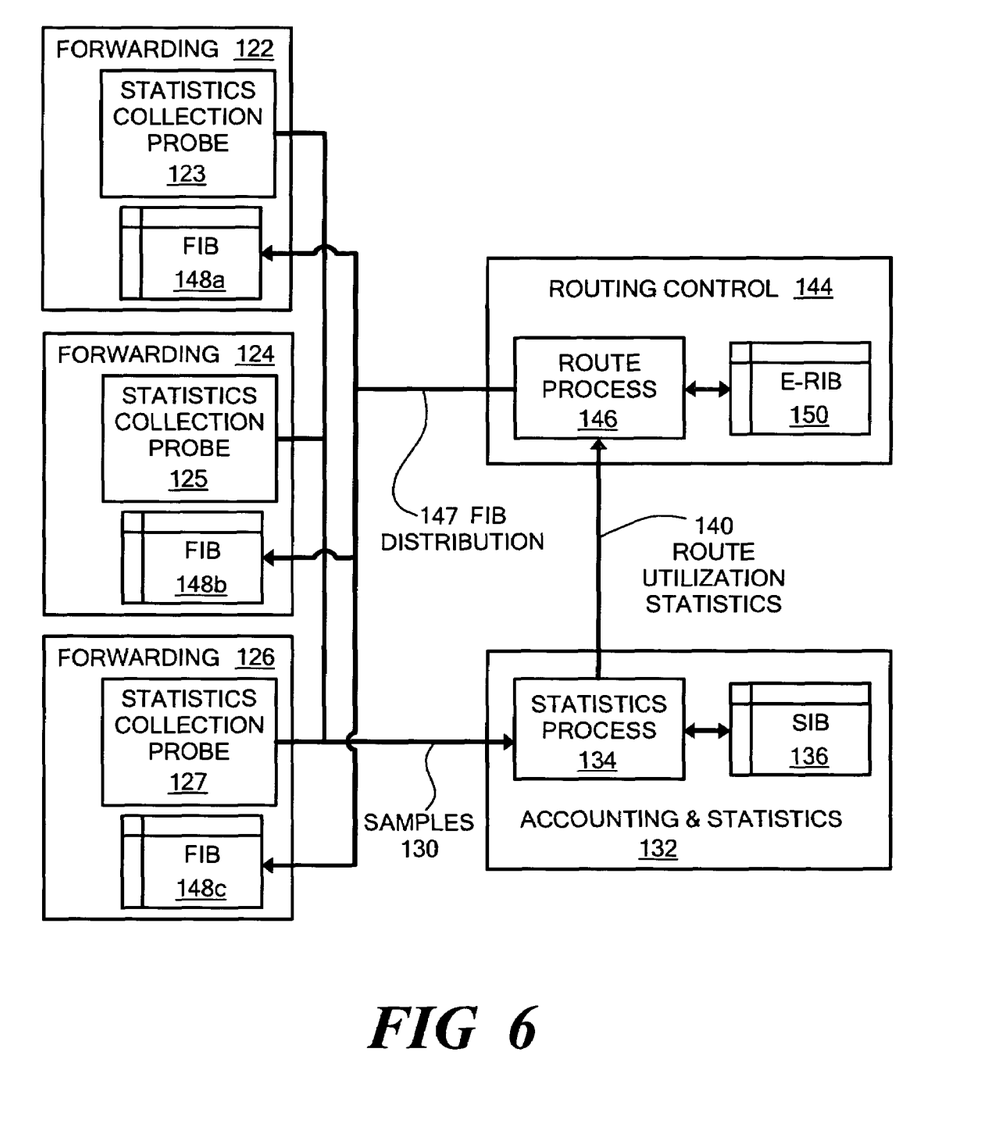
FIG. 6 is a block diagram showing an embodiment of the disclosed system using collected statistics data to enhance at least one routing protocol.

FIG. 6 is a block diagram showing an embodiment of the disclosed system that uses collected statistics data to enhance at least one routing protocol. The forwarding devices 122, 124 and 126 are shown including corresponding statistics collection probes 123, 125 and 127 and forwarding information base (FIB) tables 148a, 148b and 148c received from the route process 146 in the routing control system. Each of the statistics collection probes 123, 125 and 127 represents a component residing in the traffic plane of the corresponding forwarding device, that samples flows and collects statistics for a system wide accounting function. For example, each of the statistics collection probes 123, 125 and 127 may be a logical component including flow identification components within packet forwarding, statistics collection and statistics distribution functions of the forwarding devices 122, 124 and 126.

The statistics collection probes 123, 125 and 127 forward statistics samples 130, representing traffic volumes forwarded for each route entry in the respective FIB table, to the statistics processor 134 in the accounting and statistics system 132. The statistics process 134 aggregates the received statistics data, creates statistics records, and stores them in the statistics information base (SIB) 136. The statistics process 134 also provides the aggregated statistics to the route process 146 as route utilization statistics 140. The route process 146 maintains an enhanced routing information base (E-RIB) 150 that comprises information describing routes through an associated communications network, and the route utilization statistics 140. The route process 146 calculates subsequent forwarding paths based on the E-RIB 150 and generates updates to FIB tables 148a, 148b, and 148c accordingly for distribution 147 to the forwarding devices 122, 124 and 126. In this way there is a control feedback loop created that enables the routing control system 144 to improve network resource allocation and overall network performance.

The disclosed system allows a user to determine the level of statistics collection for a given operational environment, and can be efficiently configured to collect only those statistics needed to support particular user requirements. Instead of simply turning on detailed statistics collection for all traffic on a communication interface, the disclosed system allows a user to consider how the collected statistics will be used, and to identify those statistics that are actually needed for these purposes. An embodiment of the disclosed system may allow the user to cause the storage allocated for accounting elements to be dimensioned to match the specific statistics collected. Alternatively, an embodiment of the disclosed system may use a fixed storage size for accounting elements, or provide modular expandable storage.

The disclosed system supports communication services that would present a challenge for existing systems. For example, a service may be defined using the disclosed system in which customers pay extra if their packets are routed along higher quality paths across the network. The billing for such a service might be based on how far packets were transmitted, such that a packet routed over a long distance would be billed at a higher price. In order to support this service, it is necessary to allocate a rate code based on a packet's destination address. There are two ways that this can be accomplished. If there are relatively few potential destination addresses, then a static traffic matching rule for the potential address ranges can be used to trigger accounting instructions. If, on the other hand, there are many potential destination addresses, the service provider needs to be able to translate distance information for each route in the routing tables to charging codes and collect statistics for the traffic in each one. The disclosed system can handle either of these approaches, since the statistics function is invocable throughout the forwarding engine logic, from traffic matching rules, or based on attributes defined within the forwarding component of the forwarding engine.

The disclosed system abstracts packet count totals from other details of the monitored flows. A variety of methods can be used to define different types of flows in the data path. A forwarding device's management system operates to configure mechanisms in the data path to identify packets belonging to a monitored flow and make calls to the statistics collection function. The statistics collection function call includes a unique identifier associated with the monitored flow, and other attributes of the packet, such as the number of bytes in the packet. In this way the disclosed statistics probe uses a very simple primitive operation that lends itself to high performance, while providing great flexibility to monitor any type of flow that the underlying forwarding system can isolate. In one embodiment, the traffic between the statistics collection probe and the management system only contains the packet and byte counts, plus some small overhead information. Accordingly, only a modest system bus bandwidth is needed to support monitoring of a large number of accounting flows.

The transfer protocol for communicating the statistics samples can be made reliable, for example by including a checksum. Additionally, header information may be included to indicate which statistics collection probe is reporting a given sample in a multi-probe system, and to allow for retransmission to recover from transmission errors. Such parameters may be fine tuned to determine the statistics capacity and minimum sample period for a given embodiment or configuration.

The disclosed system can support statistics gathering for ingress and egress traffic of a given device. A single statistics collector may serve both ingress and egress collection functions, with an accounting manager supervising allocation of element IDs distinguishing between ingress and egress traffic as needed. Alternatively, independent statistics collectors may be used for ingress and egress traffic. The disclosed system supports monitoring of user (service providing) communication interfaces, and the granularity of statistics may need to be relatively fine such that usage over such interfaces can be tracked for instance by service level, rate contract compliance, and, if necessary, by protocol type. However, this level of detail may only be required to be supported on ingress traffic, whereas egress statistics may tend to track only aggregate packet delivery. The disclosed system, however, can support the same level of detailed statistics collection for egress traffic, provided a forwarding device provides egress mechanisms to classify the traffic into the required monitored flows.

Element identifiers may be used directly or indirectly as abstract identifiers associated with corresponding monitored flows, having meaning to the system level accounting management system and providing a single simple accounting primitive function for the statistics collectors. For example, a user's service interface may be allocated several identifiers to track component flows, while the service provides for two different quality of service levels, each with a rate contract. Under such circumstances, six totals identifiers would be needed to track compliant service level 1 (SL1) packets, compliant burst level SL1 packets, non-compliant (discarded) SL1 packets, compliant SL2 packets, etc.

Handling Procedures for Partial Samples

When a new monitored flow is established, the least disruptive point to begin monitoring the new monitored flow is at the start of a new sampling interval. This may be especially true when the sampling interval is fairly short, so that there is not a long delay before statistics collection starts, and when the newly monitored flow will run across multiple sample periods. In the event monitoring of a flow is started during the current sampling interval, the management function may record the monitoring start time so that the initial partial sampling interval for the flow can be compensated for when accounting records are created.

Another partial sample condition may occur when terminating monitoring for a flow. For example, a communications interface may be stopped and/or restarted midway through a sampling interval. Accordingly, statistics should not be compiled based on the complete sampling interval. To address this situation, a system manager may trigger a premature flush of all statistics in the statistics collector for the affected flow. An indication is then provided to the management system that the affected sampling period terminated prematurely, and possibly including the actual measured duration. Final accounting records can then be reported correctly. An alternative approach is for the management system to synchronize the restarting of the interface with the statistics collection system, such that the affected flow terminates at the end of the current sampling interval and the interface is stopped and/or restarted at the same time.

Since the shadow sample is being transmitted to the system control function while the active sample is being collected, this may interfere with prematurely flushing the statistics from the active sample if it were desirable for some reason to store a partial sample. However, instead of using one large accounting element store, the accounting elements could be segmented into smaller stores, each associated with one or more independent traffic sources. For example, a separate store might be allocated per interface or line card. The source specific accounting element sets then become failure groups, limiting the impact of isolated failures. Some control memory may be allocated to maintain the location of each failure group's active and inactive store area.

Alternatively, statistics data within a sample that has been compromised by some failure or other condition causing a portion of the statistics to be invalid may be marked with an invalid code (e.g. set all bits in the data to '1'), and flushed as normal. This allows the management system to report the error in an appropriate way.

Determining the Sampling Interval

As described above, for each sampling interval, a set of samples is collected that must be conveyed from the statistics collector to the system control function. As the sampling interval is reduced, system communication volume increases. Conversely, an increase in the sampling interval reduces the overall bandwidth required to convey the sampled data. Setting the sampling interval to the right value for a given deployment must take into account several requirements. The sampling interval must provide the required resolution for the user application. For billing applications, hourly samples are usually more than adequate. However, detailed traffic studies may need samples every few seconds or minutes to investigate traffic behavior in finer detail. The capabilities of internal system buses may impose bandwidth limitations that must be managed. For example, the available system bus bandwidth may provide a bound on the number of statistics that can be collected at the shortest sampling interval, since it must be possible to convey one set of collected samples within the time it takes to gather the next sample, and the transfer time is determined by the data rate of the system bus and the amount of bits that must be sent. Some additional time may need to be allocated to account for retransmission in the case of errors or congestion problems.

Another sampling interval consideration arises when different accounting requirements share the same collection probe. If statistics are being gathered for fine grained accounting applications, then many samples must be combined in the accounting management function to create any necessary coarse grained accounting records. The coarse-grained sampling rate must then be a multiple of the fine-grained sampling interval. The fine-grained sampling interval of the shared collection probe can be termed the snapshot interval as distinct from the final accounting record sampling interval. In fact, there are advantages to having a fairly short snapshot interval. If the snapshot interval is short it can be convenient to wait until the start of a new snapshot period to begin collecting for a new accounting flow instance. Another possibility is to flush the probe frequently and store the statistics in a non-volatile store to limit the potential loss of data in the event of a system failure or some sub-component that affects the accounting probe.

Another possible embodiment along these lines involves providing multiple collection probes within a single forwarding device, that can each be independently programmed. For example, two probes could be provided on a single interface card, and accounting flows allocated to the most appropriate one based on the required sampling rate.

Example Applications

The disclosed system may be used for a variety of statistical applications. For example, the disclosed system may be used for interface specific IP accounting, in order to collect statistics describing IP packet flows transmitted across an interface. The statistics may be provided, for example, in the form of a set of records counting the number of packets and bytes measured during a time interval common to all the records. These features may be used for billing and customer service monitoring. Statistics can be collected for each service class assigned to a given customer. Policed service classes require packet and byte counts for each service class broken down into CIR compliant, BIR compliant, non-compliant but accepted, and dropped non-compliant packets. This data can also support traffic engineering applications.

In the context of MPLS label accounting, label statistics for frames (similar to packets) and bytes must be maintained for all labels defined in the routers label information base (LIB). The accounting can be provided per service class to support QoS use of the EXP bits in the MPLS header.

The disclosed system is also applicable to autonomous system (AS) source/destination accounting. A common application at Internet peering point locations is to collect source and destination autonomous system (AS) information and build a view of the volume of traffic transiting the Service Provider's network. The resulting matrix describing traffic flow between the set of autonomous system numbers (ASNs) can be analyzed to learn important traffic engineering information. For example, where significant traffic is terminating on a non-peer network, the cost of paying transit to that destination might be saved if a new peering can be established directly with the non-adjacent AS. The traffic would need to be significant in both directions for there to be mutual benefit to such a peering since the costs of setting up and running the interconnection needs to be shared.

Each packet is assigned to a flow that corresponds to a unique source and destination ASN pair. The ASNs are discovered by matching the IP addresses in the packet header with their matching active routes from the routing table and taking the first ASN from the BGP (Border Gateway Protocol) AS path attribute. If the route is an atomic-aggregate, the aggregating ASN is used as the origin. The origin ASN of the source address is the source AS, and the origin ASN of the destination address is the destination AS. This application requires the forwarding process to select packet flows based on element identifiers returned from lookups in the forwarding table.

Traffic engineering applications may also utilize the disclosed system. Specifically, traffic engineering requires monitoring and identification of traffic demand information to analyze network loading in the core network. Service Providers need to monitor and learn their current traffic patterns within the core network. This is typically a requirement at the edge of the core network, for example at the connecting trunks to the backbone. In such a context, a collection probe that can collect 15-minute samples of packet and byte counts responsive to forwarding table information may be useful. The forwarding table based accounting should allow for aggregation, where prefixes can be grouped into forwarding equivalence classes (FEC). The forwarding table needs to be enhanced to carry element identifiers to identify packets belonging to each monitored FEC.

The disclosed system is also applicable in the context of inter-AS accounting. Service Providers desire to account for traffic associated with BGP community tagged routes. The traffic may require special treatment and/or may be subject to particular charging arrangements. It will also be desirable to be able to report on the traffic and analyze it for certain traffic characteristics over time. This type of accounting is only required at inter provider connection points. This is another application in which accounting element IDs may be passed from the routing system to the forwarding table.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the invention may be embodied in computer software, the functions necessary to implement the invention may alternatively be embodied in part or in whole using hardware components such as Application Specific Integrated Circuits or other hardware, or some combination of hardware components and software.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative data structures, one skilled in the art will recognize that the system may be embodied using a variety of specific data structures. Accordingly, the invention should not be viewed as limited except by the scope and spirit of the appended claims.

What is claimed is:

1. A system for network accounting statistics collection, comprising:
   a statistics collector associated with a packet forwarding engine;
   at least one accounting element within said statistics collector, wherein said accounting element includes at least one counter;
   wherein said packet forwarding engine is operable to generate at least one accounting instruction in response to a packet processed by said forwarding engine, wherein said accounting instruction includes unique identification of said accounting element within said statistics collector;
wherein said statistics collector is operable to process at least one accounting instruction generated by said co-located forwarding engine, wherein said processing includes identifying said at least one accounting element responsive to said unique identification of said accounting element in said accounting instruction, and wherein said processing includes incrementing said at least one counter within said at least one accounting element responsive to said at least one accounting instruction; and
a system control component operable to forward a contents of said at least one accounting element to an accounting and statistics system, and wherein said accounting and statistics system is further operable to compute at least one statistical output based on said contents of said at least one accounting element, and wherein said accounting and statistics system is further operable to forward statistical output to a routing control system, wherein said routing control system is operable to use said at least one statistical output to determine a new route for a packet flow in response to said statistical output and distribute said new route for said packet flow to at least one networking device.

2. The system of claim 1, wherein said at least one counter includes a packet counter, and wherein said incrementing said at least one counter within said at least one accounting element responsive to said at least one accounting instruction includes incrementing said packet counter.

3. The system of claim 1, wherein said at least one counter includes a byte counter, and wherein said incrementing said at least one counter within said at least one accounting element responsive to said at least one accounting instruction includes incrementing said byte counter by a byte count value stored in said accounting instruction.

4. The system of claim 1, wherein said statistics collector is further operable to collect data over a predetermined sampling interval, and, following an end of said sampling interval, send said collected data to a management system for further processing of said collected data.

5. The system of claim 1, wherein said statistics collector is further operable to reset said at least one counter in said at least one accounting element to a zero value at the beginning of said sampling interval.

6. The system of claim 1, further comprising a user interface operable to obtain at least one flow definition, said at least one flow definition including at least one packet characteristic to be associated with said at least one accounting element.

7. The system of claim 1, wherein said forwarding engine is further operable to generate said at least one accounting instruction in response to processing of a packet by said forwarding engine, wherein said packet is discarded by said forwarding engine.

8. The system of claim 1, further comprising:
wherein said routing control system is further operable to distribute forwarding information to said at least one network device, wherein said forwarding information associates at least one packet characteristic with an associated one of a plurality of accounting elements; and
wherein said at least one statistical output includes route utilization information.

9. The system of claim 1, further comprising:
wherein said accounting instruction further includes a traffic class selector field, and wherein a contents of said traffic class selector field indicates a traffic class of said packet processed by said forwarding engine; and
wherein said accounting instruction further includes a policing compliance field, and wherein a contents of said policing compliance field indicates whether said packet processed by said forwarding engine was compliant with traffic policing requirements.

10. A method of collecting network accounting statistics, comprising:
generating at least one accounting instruction in response to a packet processed by a forwarding engine, wherein said accounting instruction includes unique identification of an accounting element, wherein said accounting element is one of a plurality of accounting elements;
processing said at least one accounting instruction, wherein said processing includes identifying said accounting element responsive to said unique identification of said accounting element in said accounting instruction, and wherein said processing includes incrementing at least one counter within said at least one accounting element responsive to said at least one accounting instruction; and
forwarding a contents of said at least one accounting element to an accounting and statistics system, wherein said accounting and statistics system computes at least one statistical output based on said contents of said at least one accounting element, and wherein said accounting and statistics system forwards said statistical output to a routing control system, wherein said routing control system processes said at least one statistical output to determine a new route for a packet flow in response to said statistical output and distributes said new route for said packet flow to at least one networking device.

11. The method of claim 10, wherein said at least one counter includes a packet counter, and wherein said incrementing said at least one counter within said at least one accounting element responsive to said at least one accounting instruction includes incrementing said packet counter.

12. The method of claim 10, wherein said at least one counter includes a byte counter, and wherein said incrementing said at least one counter within said at least one accounting element responsive to said at least one accounting instruction includes incrementing said byte counter by a byte count value stored in said accounting instruction.

13. The method of claim 10, further comprising collecting data over a predetermined sampling interval, and, following an end of said sampling interval, send said collected data to a management system for further processing of said collected data.

14. The method of claim 10, further comprising resetting said at least one counter in said at least one accounting element to a zero value at the beginning of said sampling interval.

15. The method of claim 10, further comprising obtaining at least one flow definition from a user, said at least one flow definition including at least one packet characteristic to be associated with said at least one accounting element.

16. The method of claim 10, further comprising generating said at least one accounting instruction in response to processing of a packet by a forwarding engine, wherein said packet is discarded by said forwarding engine.

17. The method of claim 10, further comprising:
said routing control system distributing forwarding information to said at least one network device, wherein said forwarding information associates at least one packet characteristic with an associated one of a plurality of accounting elements; and wherein said at least one statistical output includes route utilization information.

18. The method of claim 10, further comprising:

wherein said accounting instruction further includes a traffic class selector field, and wherein a contents of said traffic class selector field indicates a traffic class of said packet processed by said forwarding engine; and wherein said accounting instruction further includes a policing compliance field, and wherein a contents of said policing compliance field indicates whether said packet processed by said forwarding engine was compliant with traffic policing requirements.

19. A system for collecting network accounting statistics, comprising:

means for generating at least one accounting instruction in response to a packet processed by a forwarding engine, wherein said accounting instruction includes unique identification of an accounting element, wherein said accounting element is one of a plurality of accounting elements;

means for processing said at least one accounting instruction, wherein said processing includes identifying said accounting element responsive to said unique identification of said accounting element in said accounting instruction, and wherein said processing includes incrementing at least one counter within said at least one accounting element responsive to said at least one accounting instruction; and means for forwarding a contents of said at least one accounting element to an accounting and statistics system, wherein said accounting and statistics system computes at least one statistical output based on said contents of said at least one accounting element, and wherein said accounting and statistics system forwards said statistical output to a routing control system, wherein said routing control system processes said at least one statistical output to determine a new route for a packet flow in response to said statistical output and distributes said new route for said packet flow to at least one networking device.

\* \* \* \* \*